Patented Jan. 14, 1936

2,028,017

UNITED STATES PATENT OFFICE 2,028,017

CHROMITE MATERIAL AND METHOD OF MAKING THE SAME

Gilbert E. Seil, Conshohocken, Pa., assignor to E. J. Lavino and Company, Philadelphia, Pa., a corporation of Delaware No Drawing. Application May 27, 1931, Serial No. 540,495

10 Claims. (Cl. 106—9)

Refractories, or refractory bodies of preformed shape, e. g., bricks, are used in the construction of furnaces employed in various industrial arts. The choice of the materials of which such refractories are made depends upon the service to be performed thereby.

Speaking generally, refractories may be divided into the three classes of acid, basic and neutral as exemplified by silicon dioxide (silica), magnesite and chromite respectively.

In the production of refractories, whether basic, acidic or neutral, it is important to control two factors; namely, the character of the bond and the amount of bond in the finished product; and it is to this end that the present invention is directed.

Natural chrome ore contains a source of bond in the gangue, and when preformed refractory bodies formed therefrom are processed at high temperatures, there is such a variation of bond in the finished product, that the loss, due to spalling or crumbling is at times very large;— the results being more or less fortuitous.

As a result of prolonged study and experimentation, I have discovered that it is possible so to process the crude refractory materials that one is enabled to control not only the characteristics of the bond but the amount of bond in the completed product. Crude chrome ores, according to their source, contain in the gangue the "bond" which is relied on in the manufacture or processing of the finished refractory bodies. The bond, however, varies within relatively wide ranges, according to the source and type of the ore, and after the processing, the products are consequently varied and fortuitous. The reactions and molecular rearrangements and physical changes during the burning of the preformed bricks or other shaped bodies proceed without control and cause marked variations in the finished products.

I use the word "bond" in the sense usual in this art to designate those constituents or components of the raw material which have relatively lower melting points than the major and more refractory portions of the raw material, and which during the burning process tend to unite together the more refractory particles.

In chrome ore the gangue consists chiefly of magnesium silicates, which contain some impurities such as lime, iron oxide, nickel oxide, boric oxide, alumina, etc. When such ore, after being properly comminuted is preformed, dried and then burned, various reactions and chemical rearrangements occur during the burning which are uncontrolled, and which cause, as a result, great differences in the finished products.

If, however, the raw chrome ore is first subjected to a process, whereby the original bonding property of the gangue material is changed from a crystalline nature to a product of glassy character with a softening range in contradistinction to a sharp melting point and by changing its physical placement so that at no place is there an appreciable quantity of gangue present, I find that the refractory characteristics of the ore are increased and improved and that there is now produced a crude or starting material which has improved refractory properties. Consequently, it is possible if desired to add thereto measured amounts of bond having the desired characteristics and thus secure a predetermined ratio of bond to purely refractory material. When the treated chromite is processed by comminution, tempering, pressing, drying, and burning, it produces a uniform product having optimum characteristics of density, chemical inactivity, resistance to spalling, resistance to slag penetration, and resistance to load and sagging at high temperatures.

The stabilizing of the raw material, so that no changes therein take place under service conditions of temperature, or during the burning to which the preformed product is subjected, is, so far as I am now aware, best attained by subjecting the raw materials to pre-heat-treatment at a temperature no less but preferably somewhat greater than that to which the preformed or shaped product made therefrom is subjected either in manufacture or in use. For example, if chrome ore or a mixture of chrome ores, with or without the additions of the usual correctives known to the art, is treated in a rotary kiln in the usual oxidizing atmosphere at a temperature of 3100° Fahrenheit, reactions, physical changes, and chemical and molecular rearrangements take place, whereafter the chemical rearrangements are in equilibrium, all changes which are caused by heating have taken place, and the material is fixed and stabilized. In this condition the treated material has the refractory characteristics of chromite, in which the bonding materials originally contained in the gangue, e. g., impure magnesium silicates, have been subjected to absorption and/or adsorption by the chromite and have undergone complex chemical reactions, so that they are no longer effective as a bond in the usual meaning of the term. When the prepared or processed material is cooled after the heat treatment, recrystallization of the chromite has been effected, but without causing any restoration of a deleterious bond therein.

After the raw material has been preheated and stabilized so that it no longer contains active bonding properties under thermal conditions during the burning of the preformed or shaped bodies or during any service conditions to which the finished refractory bodies are subjected, then there may be added to it a predetermined proportion of a known bond of a given type. These bonds vary according to the material, its source and the temperature at which the burning of the preformed body is to take place.

Untreated chrome ore, containing a known proportion of bond, may be, and preferably is, used as the bond or bonding agent for the pretreated and stabilized chrome ore. By qualitative and quantitative analyses including petrographic analysis, the proportion of bond in a given chrome ore may be accurately determined. Thus to a given proportion of the pretreated and stabilized chrome ore is added a measured proportion of the untreated chrome ore having a known and definite quantity of bond. Of course, any other suitable bond, e. g., bauxite, may be employed instead of that contained in the gangue of the raw untreated chrome ore.

As an example of the manner in which my process may be carried out, in producing neutral refractories one proceeds as follows:

The raw material, chrome ore, or a mixture of chrome ores, with or without the addition of corrective materials, are heated in a rotary kiln in the usual oxidizing atmosphere, at a temperature sufficient to effect the stabilization. This temperature should be not less than the temperature to which the preformed refractory body after burning is subjected under conditions of service, and is preferably about or above 3100° Fahrenheit. This treatment is continued until the raw material has been stabilized and the reactions and chemical and molecular rearrangements are in equilibrium.

On completion of the heat treatment the product is cooled. This is accomplished, if desired, by quenching it in water directly on discharge from the kiln. Following this, the treated material is ground, and is classified by sieves of different mesh according to particle size. It is highly desirable that the coarse materials be in irregular shapes with sharp corners, and the fines well ground and rounded, so that they will fill the voids in the shaped product. For this purpose I preferably employ successively grinders of the types known as jaw crushers, ring roll mills and ball mills. To a predetermined measured charge of the pretreated ground material is added the proper measured charge of bond, e. g., bauxite or raw chrome ore having a known proportion of bond, with any suitable corrective for the added bond, and the mixture is placed in a wet pan and tempered to the proper point with water, usually in the presence of a binder. Any of the suitable binding agents known to the art may be employed, such, for example, as goulac or sulphite pitch.

In the wet pan the mixing operation is carried on until a homogeneous mixture is approached. By any of the usual preforming or molding instrumentalities, which are common in the industry, the mixture is shaped or formed into articles of the desired size and shape, which are then thoroughly dried for the removal of contained free moisture. The preformed or shaped articles are now burned under definite control as to time and temperature, say for three to seven days at a burning range of from 2600° to 2800° Fahrenheit, after which they are slowly cooled, and are ready for shipment and use.

It is apparent from the foregoing that the bond in the final refractory may be selected to suit the particular ore or raw material, and that its type and amount are consequently under direct control so that the final results may be predicted with accuracy, and are not variable and fortuitous as in the case where the bond more or less relied on is only in the gangue of the raw ore. By the precalcination, the original bond,—the impure silicates—in the gangue are, as previously stated, rendered impotent at the temperatures at which the shaped material is burned. The finished refractories are neutral and non-reactive in service under acidic, basic or neutral conditions.

Various changes may be made in the process as herein specifically set forth without departure from the scope of the invention as set forth in the claims.

As a result of my process there is produced a crude material having definite and known properties and characteristics with a definite known proportion of bond, and with or without correctives, so that the finished product itself contains only that predetermined proportion of bond which is desirable to insure that the product shall have the optimum characteristics.

I have employed the term "crude ore" or "natural ore" in the specification and claims in the broad sense as including a raw mineral as mined, a mineral which has been milled or concentrated, or a mineral material which has not received a treatment by which the hereindescribed stabilization has taken place.

Having thus described by invention, what I claim and desire to secure by Letters Patent is:—

1. The process of making recrystallized chromite, having the gangue disseminated over the surfaces of the chromite crystals, from natural chrome ore which comprises heating natural chrome ore at a temperature above the recrystallization point of the chromite without fusion thereof to bring the ore, including the gangue, into physical and chemical equilibrium at said temperature and to distribute the gangue so that at no place is there a concentration of gangue present; and thereafter cooling said heated ore.

2. The process of making recrystallized chromite, having the gangue disseminated over the surfaces of the chromite crystals, from natural chrome ore which comprises heating natural chrome ore at a temperature above approximately 3100° F. without fusion of the chromite thereof to bring the ore, including the gangue, into physical and chemical equilibrium at said temperature and to distribute the gangue so that at no place is there a concentration of gangue present; and thereafter cooling said heated ore.

3. The process of making recrystallized chromite, having the gangue disseminated over the surfaces of the chromite crystals, from natural chrome ore which comprises heating natural chrome ore at a temperature above approximately 3100° F. without fusion of the chromite thereof to bring the ore, including the gangue, into physical and chemical equilibrium at said temperature and to distribute the gangue so that at no place is there a concentration of gangue present; and thereafter cooling said heated ore by quenching it in water.

4. The process of making a chromite refractory which comprises heating natural chrome ore at a temperature above the recrystallization point of the chromite without fusion thereof to bring the ore, including the gangue, into physical and chemical equilibrium at said temperature and to distribute the gangue so that at no place is there a concentration of the gangue present; cooling said heated ore; employing said recrystallized chromite having the gangue disseminated over the surfaces of the chromite crystals as an ingredient in a chromite refractory mix; and thereafter tempering, pressing, and burning said mix.

5. The process of making a chromite refractory which comprises heating natural chrome ore at a temperature above approximately 3100° F. without fusion of the chromite thereof to bring the ore, including the gangue, into physical and chemical equilibrium at said temperature and to distribute the gangue so that at no place is there a concentration of the gangue present; cooling said heated ore; employing said recrystallized chromite having the gangue disseminated over the surfaces of the chromite crystals as an ingredient in a chromite refractory mix; and thereafter tempering, pressing, and burning said mix.

6. The process of making a chromite refractory which comprises heating natural chrome ore at a temperature above approximately 3100° F. without fusion of the chromite thereof to bring the ore, including the gangue, into physical and chemical equilibrium at said temperature and to distribute the gangue so that at no place is there a concentration of gangue present; cooling said heated ore by quenching it in water; employing said recrystallized chromite having the gangue disseminated over the surfaces of the chromite crystals as an ingredient in a chromite refractory mix; and thereafter tempering, pressing, and burning said mix.

7. The process of making a chromite refractory which comprises heating natural chrome ore at a temperature above approximately 3100° F. without fusion of the chromite thereof to bring the ore, including the gangue, into physical and chemical equilibrium at said temperature and to distribute the gangue so that at no place is there a concentration of gangue present; cooling said heated ore; employing said recrystallized chromite having the gangue disseminated over the surfaces of the chromite crystals together with natural chrome ore as ingredients in a chromite refractory mix; and thereafter tempering, pressing, and burning said mix.

8. A chromite material comprising heat-treated, recrystallized, unfused, natural chromite, the chromite and accompanying gangue of which are in physical and chemical equilibrium at temperatures at least as high as the recrystallization point of the chromite and the gangue of which is so distributed over the surfaces of the chromite crystals that at no place is there a concentration of gangue present.

9. A chromite material comprising heat-treated, recrystallized, unfused, natural chromite, the chromite and accompanying gangue of which are in physical and chemical equilibrium at temperatures at least as high as approximately 3100° F. and the gangue of which is so distributed over the surfaces of the chromite crystals that at no place is there a concentration of gangue present.

10. Material for use in a chromite refractory comprising heat-treated, recrystallized, unfused, natural chromite, the chromite and accompanying gangue of which are in physical and chemical equilibrium at temperatures at least as high as approximately 3100° F. and the gangue of which is so distributed over the surfaces of the chromite crystals that at no place is there a concentration of gangue present; and raw chrome ore.

GILBERT E. SEIL.